US00RE43106E

(19) United States
(12) Reissued Patent
Yoo et al.

(10) Patent Number: US RE43,106 E
(45) Date of Reissued Patent: Jan. 17, 2012

(54) OPTICAL PICKUP COMPATIBLE WITH A DIGITAL VERSATILE DISK AND A RECORDABLE COMPACT DISK USING A HOLOGRAPHIC RING LENS

(75) Inventors: Jang-Hoon Yoo, Seoul (KR); Chul-Woo Lee, Kyunggi-Do (KR)

(73) Assignee: Samsung Electronics Co., Ltd., Suwon-si (KR)

(21) Appl. No.: 11/849,609

(22) Filed: Sep. 4, 2007

Related U.S. Patent Documents

Reissue of:

(64) Patent No.: 7,046,611
Issued: May 16, 2006
Appl. No.: 09/930,964
Filed: Aug. 17, 2001

U.S. Applications:

(63) Continuation of application No. 09/419,792, filed on Oct. 18, 1999, now Pat. No. 6,304,540, which is a continuation of application No. 09/049,988, filed on Mar. 30, 1998, now Pat. No. 6,043,912.

(30) Foreign Application Priority Data

Mar. 28, 1997 (KR) ..... 97-11297

(51) Int. Cl.
*G11B 7/00* (2006.01)

(52) U.S. Cl. ..... 369/112.08; 369/112.1; 369/112.13; 369/112.23; 369/44.23

(58) Field of Classification Search ..... None
See application file for complete search history.

(56) References Cited

U.S. PATENT DOCUMENTS

| | | | |
|---|---|---|---|
| 2,223,591 | A | 3/1941 | Dulovits |
| 2,233,591 | A | 3/1941 | Dulovits |
| 3,305,294 | A | 2/1967 | Alvarez |
| 3,958,884 | A | 5/1976 | Smith |
| 4,074,314 | A | 2/1978 | Velzel et al. |
| 4,210,391 | A | 7/1980 | Cohen |
| 4,266,534 | A | 5/1981 | Ogawa |

(Continued)

FOREIGN PATENT DOCUMENTS

DE 7263552 10/1942

(Continued)

OTHER PUBLICATIONS

Y. Komma, et al., "Dual Focus Optical Head for 0.6mm and 1.2mm disks," Optical Data Storage, SPIE vol. 2338, 1994, pp. 282-288.

(Continued)

*Primary Examiner* — Muhammad N Edun
(74) *Attorney, Agent, or Firm* — NSIP Law

(57) ABSTRACT

An optical pickup apparatus compatible with at least two types of optical recording media, using light beams having respective different wavelengths for recording and reading information, the optical pickup apparatus including two laser light sources to emit light beams having the different wavelengths, a holographic lens including a holographic ring to transmit the light beams incident in an inner region of the holographic ring, and to diffract a specific light beam among the light beams emitted from the laser light sources incident in an outer region relative to the inner region, an objective lens to focus the light beams passed through the holographic ring lens on the respective information recording surfaces of the two types of the optical recording media, optical elements to alter optical paths of the light beams reflected from the information recording surfaces of the optical recording media to corresponding photodetectors.

62 Claims, 5 Drawing Sheets

U.S. PATENT DOCUMENTS

| | | | |
|---|---|---|---|
| 4,340,283 | A | 7/1982 | Cohen |
| 4,501,493 | A | 2/1985 | Kubota |
| 4,545,653 | A | 10/1985 | Brenden et al. |
| 4,566,762 | A | 1/1986 | Kato |
| 4,612,437 | A | 9/1986 | Ohsato |
| 4,631,397 | A | 12/1986 | Ohsato et al. |
| 4,733,943 | A | 3/1988 | Suzuki et al. |
| 4,741,605 | A | 5/1988 | Alfredsson et al. |
| 4,904,856 | A | 2/1990 | Nagahama et al. |
| 4,918,679 | A | 4/1990 | Opheij et al. |
| 4,929,823 | A | 5/1990 | Kato et al. |
| 4,938,573 | A | 7/1990 | Saito |
| 4,995,714 | A | 2/1991 | Cohen |
| 4,995,715 | A | 2/1991 | Cohen |
| 5,097,464 | A | 3/1992 | Nishiuchi et al. |
| 5,120,120 | A | 6/1992 | Cohen et al. |
| 5,132,843 | A | 7/1992 | Aoyama et al. |
| 5,142,411 | A | 8/1992 | Fiala |
| 5,153,778 | A | 10/1992 | Sasian-Alvarado |
| 5,161,040 | A | 11/1992 | Yokoyama et al. |
| 5,161,148 | A | 11/1992 | Hori et al. |
| 5,164,584 | A | 11/1992 | Wike, Jr. et al. |
| 5,195,072 | A | 3/1993 | Fukui et al. |
| 5,231,624 | A | 7/1993 | Finegan |
| 5,235,581 | A | 8/1993 | Miyagawa et al. |
| 5,303,221 | A | 4/1994 | Maeda et al. |
| 5,345,072 | A | 9/1994 | Hayashi et al. |
| 5,349,471 | A | 9/1994 | Morris et al. |
| 5,386,319 | A | 1/1995 | Whitney |
| 5,438,187 | A | 8/1995 | Reddersen et al. |
| 5,446,565 | A | 8/1995 | Komma et al. |
| 5,473,471 | A | 12/1995 | Yamagata |
| 5,496,995 | A | 3/1996 | Kato et al. |
| 5,513,158 | A | 4/1996 | Ohsato |
| 5,526,338 | A | 6/1996 | Hasman et al. |
| 5,583,843 | A | 12/1996 | Horinouchi |
| 5,587,981 | A | 12/1996 | Kamatani |
| 5,612,942 | A | 3/1997 | Takahashi |
| 5,615,199 | A | 3/1997 | Tatsuno et al. |
| 5,615,200 | A | 3/1997 | Hoshino et al. |
| 5,636,190 | A | 6/1997 | Choi |
| 5,638,353 | A | 6/1997 | Takahashi |
| 5,659,533 | A | 8/1997 | Chen et al. |
| 5,665,957 | A | 9/1997 | Lee et al. |
| 5,696,750 | A | 12/1997 | Katayama |
| 5,703,856 | A | 12/1997 | Hayashi et al. |
| 5,703,862 | A | 12/1997 | Lee et al. |
| 5,708,638 | A | 1/1998 | Braat et al. |
| 5,717,674 | A | 2/1998 | Mori et al. |
| 5,724,335 | A | 3/1998 | Kobayashi |
| 5,734,512 | A | 3/1998 | Shin et al. |
| 5,734,637 | A | 3/1998 | Ootaki et al. |
| 5,737,300 | A | 4/1998 | Ota et al. |
| 5,754,512 | A | 5/1998 | Komma et al. |
| 5,768,242 | A | 6/1998 | Juday |
| 5,777,803 | A | 7/1998 | Ju et al. |
| 5,777,973 | A | 7/1998 | Yoo et al. |
| 5,790,503 | A | 8/1998 | Mizuno et al. |
| 5,796,683 | A | 8/1998 | Sumi et al. |
| 5,815,293 | A | 9/1998 | Komma et al. |
| 5,822,135 | A | 10/1998 | Lee et al. |
| 5,844,879 | A | 12/1998 | Morita et al. |
| 5,909,424 | A | 6/1999 | Lee et al. |
| 5,917,800 | A | 6/1999 | Choi |
| 5,930,214 | A | 7/1999 | Kasahara et al. |
| 5,982,732 | A | 11/1999 | Yamanaka |
| 5,986,779 | A | 11/1999 | Tanaka |
| 6,043,912 | A | 3/2000 | Yoo et al. |
| 6,052,237 | A | 4/2000 | Opheij et al. |
| 6,304,540 | B1 | 10/2001 | Yoo et al. |
| 6,788,636 | B2 | 9/2004 | Yoo et al. |
| 2002/0027862 | A1 | 8/2002 | Yoo et al. |

FOREIGN PATENT DOCUMENTS

| | | |
|---|---|---|
| EP | 0 587 297 | 3/1994 |
| EP | 0 747 893 | 12/1996 |
| EP | 0 803 867 | 10/1997 |
| EP | 0 838 812 | 4/1998 |
| GB | 508448 | 6/1939 |
| JP | 62-73429 | 4/1987 |
| JP | 2-118508 | 5/1990 |
| JP | 3-244450 | 10/1991 |
| JP | 4-178931 | 6/1992 |
| JP | 5-81698 | 4/1993 |
| JP | 5-242520 | 9/1993 |
| JP | 6-96466 | 4/1994 |
| JP | 6-259804 | 9/1994 |
| JP | 7-65407 | 3/1995 |
| JP | 7-98431 | 4/1995 |
| JP | 7-302437 | 11/1995 |
| JP | 7-311969 | 11/1995 |
| JP | 8-55363 | 2/1996 |
| JP | 8-62493 | 3/1996 |
| JP | 8-240718 | 9/1996 |
| WO | WO 98/19303 | 5/1998 |

OTHER PUBLICATIONS

Tagaki et al., "DVD/CD Compatible Pick-up with Liquid Crystal Shutter," IEEE (1997).

M. Shinoda, et al., "Two-Element Objective Lenses and Spherical Aberration Correction for DVR," IEEE Transactions on Consumer Electronics, vol. 42, No. 3, pp. 808-813 (Aug. 1996).

OPTICAL PICKUP COMPATIBLE WITH A DIGITAL VERSATILE DISK AND A RECORDABLE COMPACT DISK USING A HOLOGRAPHIC RING LENS

Matter enclosed in heavy brackets [ ] appears in the original patent but forms no part of this reissue specification; matter printed in italics indicates the additions made by reissue.

CROSS-REFERENCE TO RELATED APPLICATIONS

This application claims the benefit of Korean Application No. 97-11297, filed Mar. 28, 1997, and is a continuation of U.S. patent application Ser. No. 09/419,792 filed in the U.S. Patent and Trademark Office on Oct. 18, 1999 and which issued as U.S. Pat. No. 6,304,540 which is a continuation of U.S. patent application Ser. No. 09/049,988 filed Mar. 30, 1998, which issued as U.S. Pat. No. 6,043,912, the disclosures of which are incorporated herein by reference.

BACKGROUND OF THE INVENTION

1. Field of the Invention

The present invention relates to an optical pickup apparatus compatible with a digital video disk (DVD) and a recordable compact disk (CD-R), and more particularly, to an optical pickup apparatus which can compatibly record information on and read information from a digital video disk (DVD) and a recordable compact disk (CD-R), respectively, using a holographic lens.

2. Description of the Related Art

An optical pickup apparatus records and reads the information such as video, audio or data at a high density, and various types of recording media are a disk, a card and a tape. Among them, the disk type is primarily used. Recently, in the field of the optical disk apparatus, a laser disk (LD), a compact disk (CD) and a digital video disk (DVD) have been developed. Such an optical disk includes a plastic or glass medium having a certain thickness along an axial direction to which light is incident, and a signal recording surface on which information is recorded and located on the plastic or glass medium.

So far, a high-density optical disk system enlarges a numerical aperture of an objective lens to increase a recording density, and uses a short wavelength light source of 635 nm or 650 nm, Accordingly, the high-density optical disk system can record or read signals on or from a digital video disk, and can also read signals from a CD. However, to be compatible with a recent type of a CD, that is, a recordable CD (CD-R), light having a wavelength of 780 nm should be used, due to the recording characteristic of the CD-R recording medium. As a result, using the light beam wavelengths of 780 nm and 635 (or 650) nm in a single optical pickup becomes very important for compatibility of the DVD and the CD-R. A conventional optical pickup which is compatible with the DVD and the CD-R will be described below with reference to FIG. 1.

FIG. 1 shows an optical pickup using two laser light diodes as light sources for a DVD and a CD-R and a single objective lens. The FIG. 1 optical pickup uses laser light having a wavelength of 635 nm when reproducing a DVD, and uses laser light having a wavelength of 780 nm when recording and reproducing a CD-R.

Light having the 635 nm wavelength emitted from a first laser light source 11 is incident to a first collimating lens 12, in which the light is shown in a solid line. The first collimating lens 12 collimates the incident light beam to be in a parallel light beam. The light beam passing through the first collimating lens 12 is reflected by a beam splitter 13 and then goes to an interference filter prism 14.

Light having the 780 nm wavelength emitted from a second laser light source 21 passes through a second collimating lens 22, a beam splitter 23 and a converging lens 24, and then goes to the interference filter prism 14, in which the light is shown in a dotted line. Here, the light beam of the 780 nm wavelength is converged by the interference filter prism 14. An optical system having such a structure is called a "finite optical system." The interference filter prism 14 totally transmits the light beam of the 635 nm wavelength reflected from the beam splitter 13, and totally reflects the light beam of the 780 nm wavelength converged by the converging lens 24. As a result, the light beam outgoing from the first laser light source 11 is incident to a quarter-wave plate 15 in the form of a parallel beam by the collimating lens 12, while the light beam from the second laser light source 21 is incident to the quarter-wave plate 15 in the form of a divergent beam by the converging lens 24 and the interference filter prism 14. The light transmitted through the quarter-wave plate 15 passes through a variable aperture 16 having a thin film structure and then is incident to an objective lens 17.

The light beam of the 635 nm wavelength emitted from the first laser light source 11 is focused by the objective lens 17 on an information recording surface in the DVD 18 having a thickness of 0.6 mm. Therefore, the light reflected from the information recording surface of the DVD 18 contains information recorded on the information recording surface. The reflected light is transmitted by the beam splitter 13, and is then incident to a photodetector for detecting optical information.

If the finite optical system described above is not used, when the light beam of the 780 nm wavelength emitted from the second laser light source 21 is focused on an information recording surface in the CD-R 25 having a thickness of 1.2 mm using the above described objective lens 17, spherical aberration is generated due to a difference in thickness between the DVD 18 and the CD-R 25. The spherical aberration is due to the fact that the distance between the information recording surface of the CD-R 25 and the objective lens 17 is farther than that between the information recording surface of the DVD 18 and the objective lens 17, along an optical axis. To reduce such a spherical aberration, a construction of a finite optical system including the converging lens 24 is required. By using the variable aperture 16 to be described later with reference to FIG. 2, the light beam of the 780 nm wavelength forms an optimized beam spot on the information recording surface of the CD-R 25. The light beam of the 780 nm wavelength reflected from the CD-R 25 is reflected by the beam splitter 23, and then detected in a photodetector 26.

The thin-film type variable aperture 16 of FIG. 1, as shown in FIG. 2, has a structure which can selectively transmit the light beams incident to the regions whose numerical aperture (NA) is less than or equal to 0.6, which coincides with the diameter of the objective lens 17. That is, the variable aperture 16 is partitioned into two regions based on the numerical aperture (NA) of 0.45 with respect to an optical axis. Among the two regions, a first region 1 transmits both light beams of 635 nm wavelength and 780 nm wavelength. A second region 2 totally transmits the light beam of the 635 nm wavelength and totally reflects the light beam of the 780 nm wavelength. The region 1 is a region having a numerical aperture less than or equal to 0.45, and the region 2 is an outer region relative to the region 1 in which a dielectric thin film is coated. The region 1 is comprised of a quartz (5102) thin film to remove any optical aberration generated by the dielectric thin film coated region 2.

By using the variable aperture 16, the 780 nm wavelength light transmitted through the region 1 having the 0.45 NA or below forms a beam spot appropriate to the CD-R 25 on the information recording surface thereof. Thus, the FIG. 1 optical pickup uses an optimum beam spot when a disk mode is changed from the DVD 18 to the CD-R 25. Accordingly, the FIG. 1 optical pickup is compatible for use with the CD-R.

However, the optical pickup shown in FIG. 1 and as described above should form a "finite optical system" with respect to the 780 nm wavelength light in order to remove any spherical aberration generated when changing a DVD compatibly with a CD-R. Also, due to the optical thin film, that is, the dielectric thin film, which is formed in the region 2 of the variable aperture 16 having the NA of 0.45 or above, an optical path difference between the light transmitted through the region 1 having the NA of 0.45 or below and that transmitted through the region 2 having the NA of 0.45 or above, is generated. To eradicate this difference, it is necessary to form an optical thin film in the region 1. Due to this reason, a quartz coating ($SiO_2$) is formed in the region 1 and a multilayer thin film is formed in the region 2. However, such a fabricating process does not only become complicated but also adjustment of the thickness of the thin film should be performed precisely in units of "μm". Thus, it has been difficult to mass-produce the optical pickup.

SUMMARY OF THE INVENTION

An object of the present invention is to provide an optical pickup apparatus which is compatible with a digital video disk (DVD) and a recordable compact disk (CD-R), by adopting an infinite optical system and using a holographic lens to remove a spherical aberration generated due to a difference in thickness between optical disks.

Additional objects and advantages of the invention will be set forth in part in the description which follows and, in part, will be obvious from the description, or may be learned by practice of the invention.

To accomplish the above and other objects of the present invention, there is provided an optical pickup apparatus compatible with at least two types of optical recording media, using light beams having respective different wavelengths for recording and reading information, the optical pickup apparatus including two laser light sources to emit light beams having different wavelengths, respectively, a holographic lens, including a holographic ring, for transmitting both of the light beams emitted from the two laser light sources in an inner region of the holographic ring, and diffracting a specific light beam among the light beams emitted from the laser light sources in an outer region of the holographic ring, an objective lens to focus the light beams passed through the holographic ring lens on the respective information recording surfaces of the two types of the optical recording media, optical elements to alter optical paths of the light beams reflected from the information recording surfaces of the optical recording media, and two photodetectors to individually detect optical information from the light beams incident from the optical elements.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
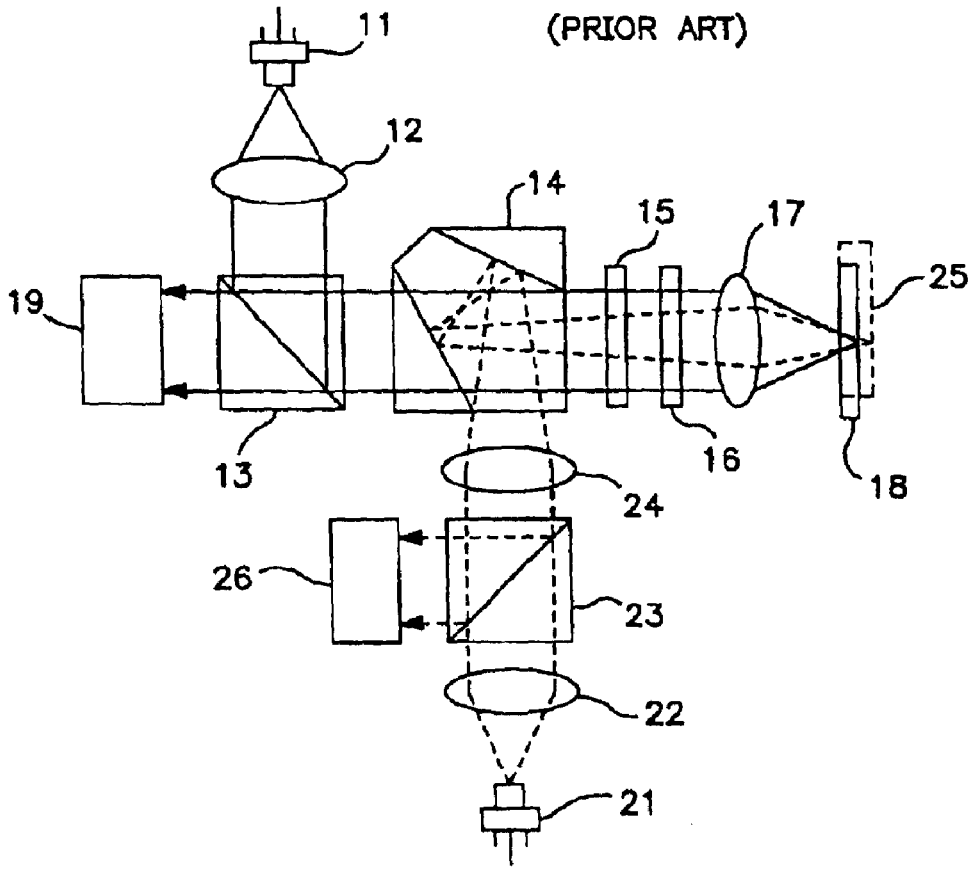
FIG. 1 (PRIOR ART)
FIG. 1 is a view showing the construction of a conventional optical pickup.
Figure 2:
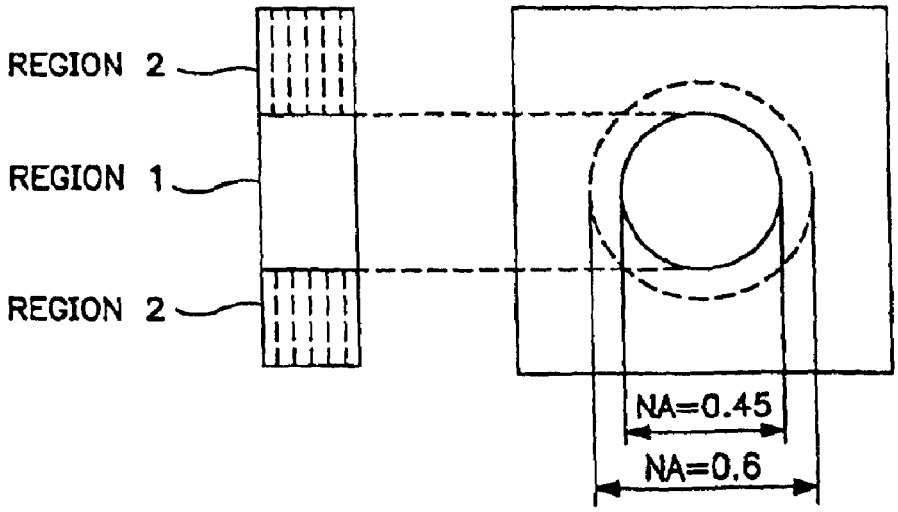
FIG. 2 (PRIOR ART)
FIG. 2 is a view for explaining the structure of a conventional variable aperture shown in FIG. 1

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
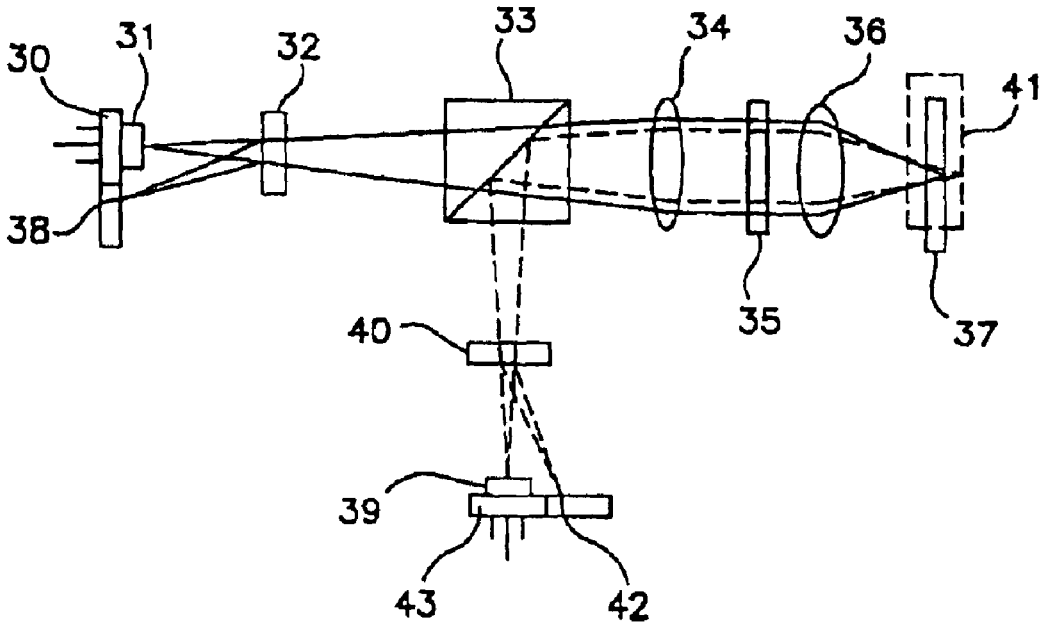
FIG. 3 is a view showing an optical system of an optical pickup according to an embodiment of the present invention.

FIG. 3 shows an optical system of an optical pickup according to an embodiment of the present invention. Referring to FIG. 3, the optical pickup apparatus includes two laser light sources 31 and 39 for emitting light beams having different wavelengths, respectively, two holographic beam splitters 32 and 40 for altering optical paths of the light beams reflected from information recording surfaces of first and second types of optical disks, a beam splitter 33 for totally transmitting or reflecting the incident light beam according to the light wavelength, a collimating lens 34 for collimating the incident light beam to be in a parallel form, a holographic ring lens 35 for diffracting the incident light beam according to its wavelength, and an objective lens 36 for focusing the light beams on the respective information recording surfaces of optical disks 37 and 41. Two photodetectors 38 and 42 which detect the light beams reflected from the respective information recording surfaces of the optical disks 37 and 41 and the laser light sources 31 and 39 are integrally incorporated into single modules to form units 30 and 43, respectively. The operation of the optical pickup constructed above will be described below, in which a DVD and a CD-R are described as optical recording media.

First, when recording and/or reading information on a DVD, a light beam having the 650 nm (or 635 nm) wavelength is emitted from the first laser light source 31 and is incident to the holographic beam splitter 32, in which the light is shown as a solid line. The incident light beam passes through the holographic beam splitter 32 and proceeds to the beam splitter 33. When recording and/or reading information about a CD-R, a light beam having the 780 nm wavelength is emitted from the second laser light source 39 and is incident to the holographic beam splitter 40, in which the light is shown as a dotted line. The incident light beam passes through the holographic beam splitter 40 and proceeds to the beam splitter 33.

The beam splitter 33 totally transmits the incident light beam of the 650 nm wavelength and totally reflects the incident light beam of the 780 nm wavelength. The totally transmitted or reflected light beam goes to the holographic ring lens 35 in the form of a parallel beam after passing through the collimating lens 34. The holographic ring lens 35 selectively diffracts the incident light beam according to the wavelength thereof, to prevent the generation of spherical aberration with regard to the light beams focused on the information recording surfaces of the optical disks 37 and 41.

Figure 4A:
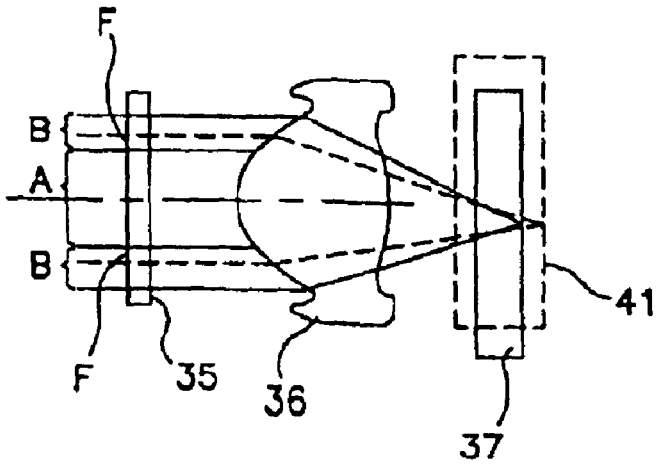
FIG. 4A is a view showing a positional relationship between a holographic ring lens and an objective lens according to the embodiment of the present invention.
Figure 4B:
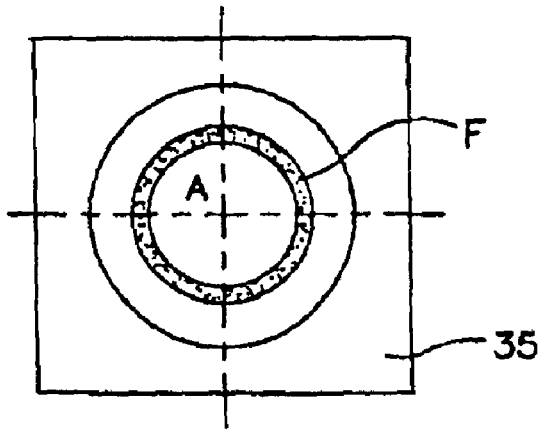
FIG. 4B is a view showing the plane surface of the holographic ring lens.

FIG. 4A is a view showing a positional relationship between the holographic ring lens 35 and an optical surface of the holographic ring lens 35. As shown in FIG. 4A, the objective lens 36 is partitioned into regions A and B. The region A, being closer to an optical axis of the objective lens 36, has little effect on a spherical aberration and the region B, being farther from the optical axis, has a large effect on the spherical aberration. Also, the objective lens 36 is most appropriate for a disk having a thin thickness such as a DVD. Thus, when a DVD is exchanged with a thick disk such as a CD-R to operate the optical pickup, the holographic ring lens 35 is required. If the holographic ring lens 35 is not used when recording and/or reading information on the CD-R, the spherical aberration in the beam spot formed on the information recording surface of the disk becomes large, in which the size is more than 1.7 μm. Generally, the size of the beam spot formed on the information recording surface of the CD-R is 1.41 μm. The holographic ring tens 35 diffracts the 780 nm wavelength light beam passed through the region F of the holographic ring lens 35 so as to prevent the generation of spherical aberration, for which a hologram depicted with dots in FIG. 4B is disposed on the region F of the holographic ring lens 35. Accordingly, the light beam which is incident to the region A of the holographic ring lens 35, passes through the objective lens 36 without any diffraction by the holographic ring lens 35, and then is directly focused on the disk. The region F of the light beam which is incident to the holographic ring lens 35, is wavelength-selectively diffracted by the holographic ring lens 35 and then proceeds to the objective lens 36. The diffracted light beam of 780 nm wavelength passing through the objective lens 36 makes the size of the beam spot focused on the disk smaller, and no spherical aberration is generated. A focal plane on which the diffracted 780 nm wavelength light beam passing through the region F is focused should coincide with an optimized surface of the disk on which the 780 nm wavelength light beam passing through the region A is focused. By using the holographic ring lens 35, a working distance from the surface of the objective lens 36 to the information recording surfaces of the disks becomes shorter in the CD-R 41 rather than in the DVD 37.

Figure 5A:
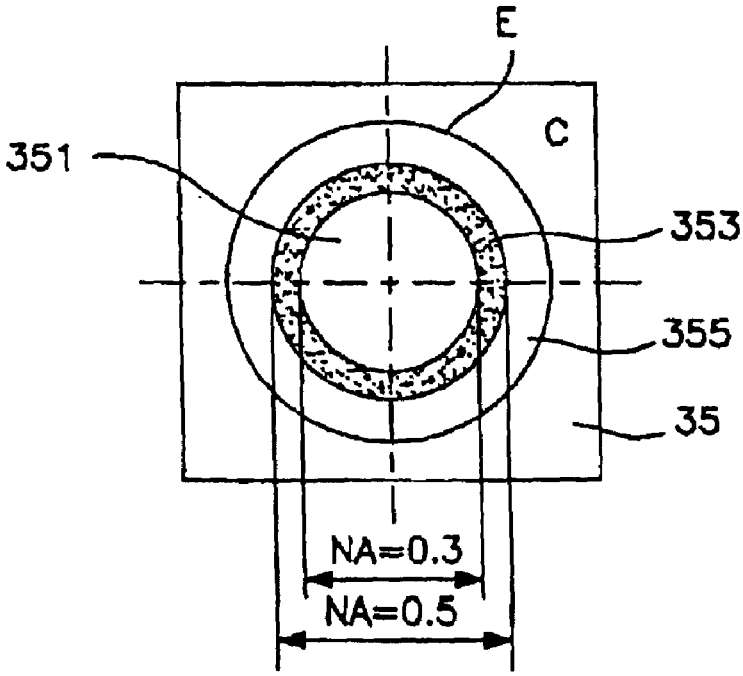
FIG. 5A is a view showing the plane surface of the holographic ring lens.

FIG. 5A is a view showing the structure of the holographic ring lens 35. The holographic ring lens 35 has an inner region 351 including an optical center of the holographic ring lens 35, a holographic ring 353 centering at the optical center of the holographic ring lens 35 and surrounding the inner region 351, and an outer region 355 surrounding the holographic ring 353. In connection with FIG. 4A, the Inner region 351 coincides with the region A, the holographic ring 353 coincides with the region F, and the outer region 355 coincides with the region B except the region F. A region D shown in FIG. 5B below where the hologram in the holographic ring lens 35 shown in FIG. 5A is provided on the holographic ring 353, corresponds to the numerical aperture of 0.3-0.5 which is intended to be appropriate to the CD-R. In FIG. 5A, a symbol E indicates the diameter of the objective lens for a DVD whose numerical aperture (NA) is 0.6. Also, the holographic ring lens 35 used in the present invention can selectively adjust the numerical aperture (NA) of the objective lens according to the wavelengths of the light beam, and requires no separate variable aperture. The holographic ring lens 35 has the same function as a general spherical lens which transmits a light beam in the convergent or divergent form. Further, the holographic ring lens 35 has a positive optical power and uses a phase shift hologram as a hologram formed in the holographic ring 353. An optimized depth of the grooves the hologram should be determined so that the holographic ring 353 selectively diffracts the incident light beam according to the wavelength thereof. The holographic ring lens 35 is constructed so that the light beam of the 650 nm wavelength has transmissive efficiency close to 100% and the light beam of the 780 nm wavelength has a zero-order transmissive efficiency 0% with respect to non-diffracted light beam. For that, in case that the holographic ring 52 has grooves of a constant depth the phase variation by the groove depth of the holographic ring should be about 360° with respect to the 650 nm wavelength light. Since the phase variation is generated by 360°, the holographic ring lens 35 transmits most of the 650 nm wavelength light. The phase variation by the holographic ring 353 should be optimized with respect to the 780 nm wavelength light, by which the 780 nm wavelength light is all diffracted as first-order light. As a result, the holographic ring 353 is designed to hardly diffract the 650 wavelength light, but to diffract the 780 nm wavelength light as a first-order diffracted light. An optimized surface groove depth d of the holographic ring 353 for selectively diffracting 650 nm and 780 nm wavelength light beams is determined by the following equations (1) and (2).

$$\frac{2\pi d}{\lambda}(n-1) = 2m\pi \tag{1}$$

$$\frac{2\pi d}{\lambda'}(n'-1) = (2m'+1)\lambda \tag{2}$$

Here, λ is the 650 nm wavelength, λ' is the 780 nm wavelength, and n and n' denote a reflective index (1.514520) in the 650 nm wavelength and a reflective index (1.511183) in the 780 nm wavelength, respectively. In the above equations (1) and (2), if m=3 and m'=2, the depth d becomes about 3.8 μm.

Figure 5B:
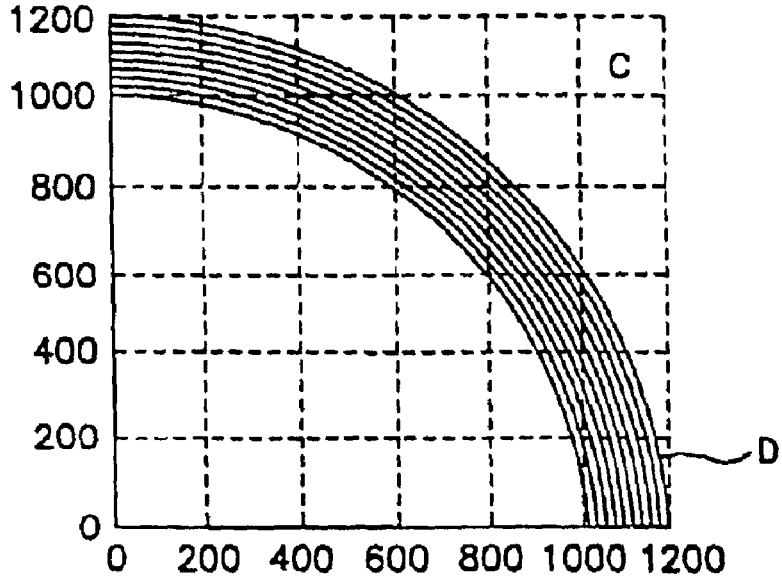
FIG. 5B is a graphical view showing that part of the FIG. 5A region which is enlarged.

FIG. 5B is a graphical view showing an enlarged view of the hologram region D shown in FIG. 5A. The hologram which is formed in the holographic ring 353 has grooves of a constant depth by etching or can be manufactured by molding. Further, grooves of the hologram can be formed stepwisely, together with a ring pattern. The grooves of the hologram can also be formed in a blazed type so as to maximize the diffraction efficiency on a non-zeroth order diffracted light.

Figure 6:
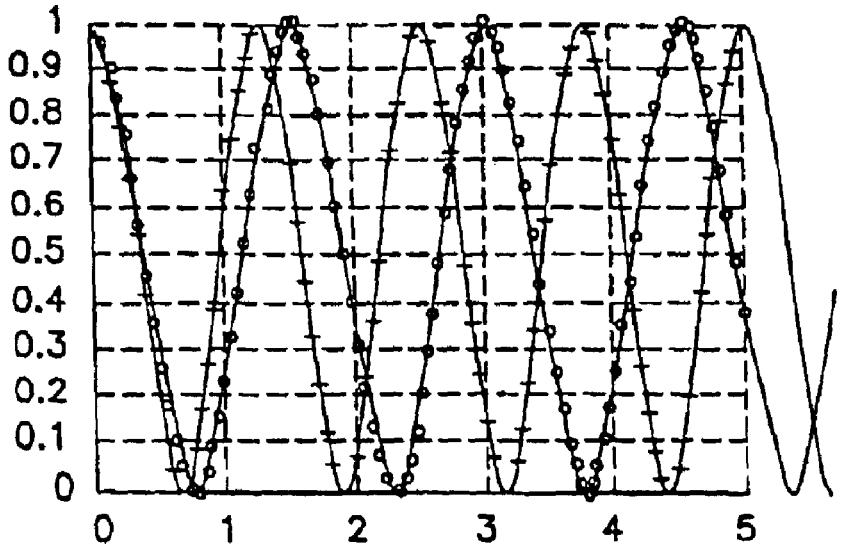
FIG. 6 is a graphical view showing transmissive efficiency according to the groove depth of the holographic ring lens with regard to two wavelengths.

FIG. 6 is a graphical view showing zero-order transmissive efficiency of the holographic ring according to the wavelengths of incident lights. When the surface groove depth d is 3.8 μm, the 650 nm wavelength light is transmitted via the holographic ring 353 by 100% as shown in a solid line overlapped with the symbol "++", and the 780 nm wavelength light is transmitted via the holographic ring 353 by 0% as shown by a solid line overlapped with a circle. At this time, the holographic ring 353 diffracts the 780 nm wavelength light as the first-order light, in which diffraction efficiency thereof is 40%.

All of the 650 nm wavelength light incident to the holographic ring lens 35 having the above characteristics is transmitted and then proceeds to the objective lens 36. The incident light beam passes through the objective lens 36 and forms a beam spot on the information recording surface of the DVD 37. The light beam reflected from the information recording surface of the DVD 37 is incident to the holographic ring lens 35. After passing through the holographic ring lens 35, the reflected light beam is incident to the collimating lens 34, the beam splitter 33 and then to the holographic beam splitter 32, wherein the holographic beam splitter 32 directs the reflected light beam to the photodetector 38. The 780 nm wavelength light incident to the holographic ring lens 35 is transmitted in the holographic lens 353 and then proceeds to the objective lens 36 as shown in FIG. 4A, but is diffracted in the region A and then proceeds to the objective lens 36. Therefore, the light beam passing through the objective lens 36 forms an optimized beam spot on the information recording surface of the CD-R 41. The light beam reflected from the information recording surface of the CD-R 41 is incident to the beam splitter 33 and then reflected. The reflected light proceeds to the holographic beam splitter 40 and then is incident to the photodetector 42 by altering the optical path.

Figure 7:
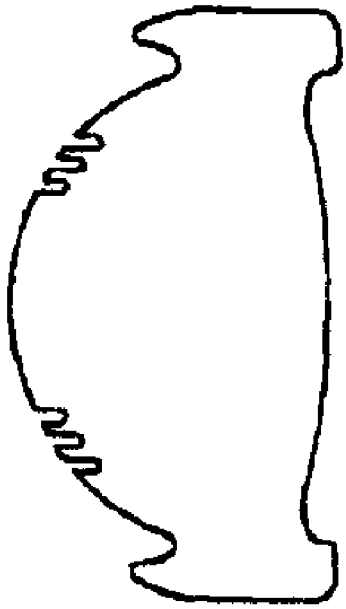
FIG. 7 is a view showing that the holographic ring lens and the objective lens are integrally incorporated.

The holographic ring lens 35 having the above functions may be manufactured integrally with an objective lens by being etched or molded to a constant depth inwards from one optical surface of the objective lens. The integrally incorporated holographic ring lens has the same function as the holographic ring lens 35. FIG. 7 is a view showing that the holographic ring lens and the objective lens are integrally incorporated.

As described above, the optical pickup apparatus according to the present invention is used compatibly with a DVD and a CD-R, by using a holographic ring lens to eliminate a spherical aberration generated in response to a disk being changed to another disk having a different thickness, in which a working distance is shorter in the case of the CD-R than the DVD. Also, the optical pickup apparatus provides advantages which include ease in construction of a holographic ring lens and good mass-production capabilities.

While only certain embodiments of the invention have been specifically described herein, it will be apparent that numerous modifications may be made thereto without departing from the spirit and scope of the invention.

What is claimed is:

1. An objective lens to form beam spots using light beams of respectively different wavelengths, the objective lens comprising:

an inner region including an optical center of the objective lens;

a holographic region surrounding said inner region and comprising a plurality of steps disposed on a lens surface of the objective lens; and an outer region surrounding said holographic region, wherein said inner region transmits the light beams, said holographic region diffracts a second one of the light beams, and the outer region transmits a first one of the light beams.

2. The objective lens according to claim 1, wherein a first focal plane on which a first portion of the second light beam incident on said holographic region is focused coincides with a second focal plane on which a second portion of the second light beam incident on said inner region is focused.

3. The objective lens according to claim 1, wherein said holographic region further comprises grooves to diffract the second light beam.

4. An objective lens for an optical pickup, the objective lens comprising:

a holographic region having a plurality of concentric ring-shaped steps formed on a lens surface of the objective lens, wherein the objective lens has a wavelength dependence such that two light beams having corresponding different wavelengths and an identical diffractive order form appropriate different wavefronts corresponding to reproducing and/or recording information from and/or to corresponding two kinds of optical recording media having respectively different thickness.

5. The objective lens according to claim 4, further comprising an inner region surrounded by said holographic region, wherein a first focal plane on which a first portion of the second light beam incident on said holographic region is focused coincides with a second focal plane on which a second portion of the second light beam incident on said inner region is focused.

6. The objective lens according to claim 4, wherein said holographic region includes grooves to diffract the light beam.

7. An objective lens to form beam spots of different sizes using corresponding first and second light beams of respectively different wavelengths, the objective lens comprising:

an inner region including an optical center of the objective lens which has an optical property optimized to focus the first light beam onto a first optical recording medium of a first thicknesses and to focus the second light beam onto a second optical recording medium of a second thickness other than the first thickness; and a diffractive region surrounding said inner region and comprising an optical property optimized so as to selectively diffract the first and second light beams as a function of wavelength so as to change a numerical aperture of the objective lens.

8. The objective lens of claim 7, wherein, to adjust the numerical aperture as the function of the wavelength, the diffractive region:

selectively diffracts the first light beam having a first wavelength so as to not be focused on the first optical recording medium, and selectively allows the second light beam of a second wavelength to be focused on the second recording medium.

9. The objective lens of claim 8, wherein the diffractive region selectively diffracts the first light beam as first order light.

10. The objective lens of claim 9, wherein the diffractive region comprises a blazed type hologram.

11. The objective lens of claim 9, wherein the diffractive region comprises grooves formed in stepwise depths.

12. The objective lens of claim 7, wherein the diffractive region is optimized to selectively diffract the first and second light beams so as to reduce spherical aberration of the first and second light beams when focused on the first and second optical recording media as the function of the wavelength.

13. The objective lens of claim 7, wherein the diffractive region is optimized to selectively diffract the first and second light beams such that the numerical aperture of the objective lens is greater for the second optical recording medium than for the first optical recording medium.

14. The objective lens of claim 13, wherein the diffractive region diffracts the first light beam of a first wavelength so as to not be focused on the first optical recording medium.

15. The objective lens of claim 14, wherein the diffractive region allows the second light beam of a second wavelength to be focused on the second optical recording medium.

16. The objective lens of claim 15, wherein the diffractive region is disposed on an optical surface having the inner region.

17. The objective lens of claim 16, wherein the optical surface is optimized with respect to the first and second light beams to be received prior to being reflected from the first and second optical recording media.

18. The objective lens according to claim 7, wherein a first focal plane to which a first portion of the second light beam incident on the diffractive region is directed coincides with a second focal plane to which a second portion of the second light beam incident on the inner region is directed.

19. The objective lens according to claim 7, wherein the diffractive region further comprises grooves optimized with respect to the second light beam so to maximize first order light and to minimize zero$^{th}$ order light.

20. An objective lens for use in focusing light beams on optical recording media of different thicknesses, comprising:

an inner region which directs the light beams having corresponding wavelengths to be focused on the corresponding optical recording media having respectively different thicknesses; and a diffractive region having a wavelength dependence such that the light beams are selectively diffracted so as to adjust a numerical aperture of the objective lens.

21. The objective lens of claim 20, wherein the diffractive region diffracts one of the light beams having one of the wavelengths so as to reduce spherical aberration when recording and/or reproducing with respect to a corresponding one of the optical recording media.

22. The objective lens of claim 21, wherein:

the one optical recording medium is a compact disk, and the diffractive portion diffracts the one light beam as first order light so as to reduce the spherical aberration with respect to the compact disk.

23. The objective lens of claim 22, wherein:

another optical recording medium is a digital versatile disk, and the diffractive portion allows another light beam of another wavelength other than the one wavelength to be directed to the digital versatile disk so as to record and/or reproduce with respect to the digital versatile disk together with a portion of the another light beam focused by the inner region.

24. The objective lens of claim 20, wherein the diffractive portion diffracts one of the light beams as first order light so as to adjust the numerical aperture of the objective lens in order to record and/or reproduce with respect to a corresponding one of the optical recording media.

25. The objective lens of claim 20, wherein a first focal plane on which a first portion of one light beam incident on the diffractive region is directed coincides with a second focal plane on which a second portion of the one light beam incident on the inner region is directed.

26. The objective lens of claim 20, wherein a first focal plane on which a first portion of one light beam incident on the diffractive region is directed does not coincide with a second focal plane on which a second portion of the one light beam incident on the inner region is directed such that a spherical aberration is reduced at the second focal plane and the numerical aperture is adjusted according to the wavelength of the one light beam.

27. The objective lens of claim 26, wherein a third focal plane on which a first portion of another light beam incident on the diffractive region is directed coincides with a fourth focal plane on which a second portion of the another light beam incident on the inner region is directed.

28. An optical system for use in focusing light beams on optical recording media of different thicknesses, comprising:

an optical element; and an objective lens, wherein the optical element comprises:

an inner region which directs the light beams having corresponding wavelengths to be focused by the objective lens on the corresponding optical recording media having respectively different thicknesses; and a diffractive region having a wavelength dependence such that the light beams are selectively diffracted so as to adjust a numerical aperture of the objective lens.

29. The optical system of claim 28, wherein the diffractive region diffracts one of the light beams having one of the wavelengths so as to reduce spherical aberration when recording and/or reproducing with respect to a corresponding one of the optical recording media.

30. The optical system of claim 29, wherein:

the one optical recording medium is a compact disk, and the diffractive portion diffracts the one light beam as first order light so as to reduce the spherical aberration with respect to the compact disk.

31. The optical system of claim 30, wherein:

another optical recording medium is a digital versatile disk, and the diffractive portion allows another light beam of another wavelength other than the one wavelength to be directed through the objective lens to the digital versatile disk so as to record and/or reproduce with respect to the digital versatile disk together with a portion of the another light beam which passed through the inner region and the objective lens.

32. The optical system of claim 28, wherein the diffractive portion diffracts one of the light beams as first order light so as to adjust the numerical aperture of the objective lens in order to record and/or reproduce with respect to a corresponding one of the optical recording media.

33. The optical system of claim 28, wherein a first focal plane on which a first portion of one light beam incident on the diffractive region is directed by the objective lens coincides with a second focal plane on which a second portion of the one light beam incident on the inner region is directed by the objective lens.

34. The optical system of claim 28, wherein a first focal plane on which a first portion of one light beam incident on the diffractive region is directed by the objective lens does not coincide with a second focal plane on which a second portion of the one light beam incident on the inner region is directed by the objective lens such that a spherical aberration is reduced at the second focal plane and the numerical aperture is adjusted according to the wavelength of the one light beam.

35. The optical system of claim 34, wherein a third focal plane on which a first portion of another light beam incident on the diffractive region is directed by the objective lens coincides with a fourth focal plane on which a second portion of the another light beam incident on the inner region is directed by the objective lens.

36. An objective lens for an optical pickup, the objective lens comprising at least one holographic region so as to selectively transmit data with respect to disks of different thicknesses using light beams, wherein the at least one holographic region comprises a plurality of gratings on the objective lens, at least one part of the at least one holographic region transmits the light beams for use in transmitting the data with respect to the disks of different thicknesses, and at least one other part of the at least one holographic region diffracts one of the light beams so as to adjust a numerical aperture of the objective lens for use in transmitting the data with respect to the disks of different thicknesses.

37. An optical pickup for use with recording media, comprising:

a light source to emit light beams of different wavelengths;

an objective lens comprising at least one holographic region, the at least one holographic region comprising a plurality of gratings on the objective lens; and an optical detector to detect the light beams after reflection from the recording media and after having passed through the objective lens, wherein:

at least one part of the at least one holographic region transmits the light beams, and at least one other part of the at least one holographic region diffracts one of the light beams.

*38. An objective lens for an optical pickup for selectively diffracting at least one of plurality of light beams, the lens comprising*

*a first surface which focuses the plurality of light beams; and*

*a second surface adjacent to the first surface and having a diffractive pattern to diffract at least one of the plurality of light beams, wherein the diffractive pattern comprises a holographic pattern.*

*39. The objective lens of claim 38, wherein:*

*the first surface includes an inner portion of the lens, and the second surface is on a periphery of the first surface.*

*40. The objective lens of claim 38, wherein the first surface does not include the diffractive pattern.*

*41. The objective lens of claim 38, wherein the diffractive pattern is configured to selectively diffract one of the plurality of light beams.*

*42. An objective lens for an optical pickup for selectively diffracting at least one of plurality of light beams, the lens comprising*

*a first surface which focuses the plurality of light beams; and*

*a second surface adjacent to the first surface and having a diffractive pattern at a location where a numerical aperture of the objective lens is higher than a predetermined numerical aperture value so as to diffract at least one of the plurality of light beams.*

*43. The objective lens of claim 42, wherein the predetermined numerical aperture value is 0.3.*

*44. The objective lens of claim 42, wherein the first surface does not include the diffractive pattern.*

*45. The objective lens of claim 42, wherein the diffractive pattern is configured to selectively diffract one of the plurality of light beams.*

*46. The objective lens of claim 42, wherein the diffractive pattern comprises a holographic pattern.*

*47. An objective lens for an optical pickup for correcting a spherical aberration caused by one of plurality of light beams, the lens comprising*

*a first surface which focuses the plurality of light beams; and*

*a second surface adjacent to the first surface and having a diffractive pattern which diffracts the plurality of light beams and which is disposed to correct the spherical aberration of at least one of the plurality of the one light beams, wherein the diffractive pattern comprises a holographic pattern.*

*48. The objective lens of claim 47, wherein the first surface does not include the diffractive pattern.*

*49. The objective lens of claim 47, wherein the diffractive pattern is configured to selectively diffract one of the plurality of light beams.*

*50. An objective lens for an optical pickup for correcting a spherical aberration caused by one of plurality of light beams, the lens comprising*

*a first surface which focuses the plurality of light beams and has a curved surface curving from an apex; and*

*a spherical aberration correction pattern formed below the apex so as to correct the spherical aberration of the one light beam.*

*51. The objective lens of claim 50, further comprising a second surface on a periphery of the first surface and having the spherical aberration correction pattern.*

*52. The objective lens of claim 50, wherein the first surface does not include the spherical aberration correction pattern.*

*53. The objective lens of claim 50, wherein the spherical aberration correction pattern is configured to selectively diffract one of the plurality of light beams.*

*54. The objective lens of claim 50, wherein the spherical aberration correction pattern comprises a holographic pattern.*

*55. A method of selectively focusing first and second light beams of respectively different wavelengths using an objective lens to form corresponding beam spots of different sizes, the method comprising:*

*receiving an emitted one of the first and second light beams at an inner region of the objective lens, the inner region including an optical center of the objective lens which has an optical property optimized to focus the first light beam onto a first optical recording medium of a first thicknesses and to focus the second light beam onto a second optical recording medium of a second thickness other than the first thickness; and*

*receiving the emitted one of the first and second light beams at a diffractive region surrounding said inner region, the diffractive region comprising an optical property optimized so as to diffract at least one of the first and second light beams as a function of wavelength so as to correct for spherical aberrations on the first and second optical recording media, wherein the diffractive region comprises a holographic pattern.*

*56. The method of claim 55, wherein the inner region does not include a diffractive region.*

*57. The method of claim 55, wherein the diffractive pattern is configured to selectively diffract the first and second light beams.*

*58. A method of selectively focusing light beams on optical recording media of different thicknesses using an objective lens, the method comprising:*

*receiving an emitted one of the light beams at an inner region of the objective lens, the inner region having an optical property which directs the light beams having corresponding wavelengths to be focused on the corresponding optical recording media having respectively different thicknesses; and*

*receiving the emitted one of the light beams at a diffractive region, the diffractive region having a wavelength dependence such that the light beams are diffracted so as to correct for spherical aberrations due to the different thicknesses of the optical recording media, wherein the diffractive region comprises a holographic pattern.*

*59. The method of claim 58, wherein the inner region does not include the diffractive region.*

*60. The method of claim 58, wherein the diffractive pattern is configured to selectively diffract the light beams.*

*61. A method of manufacturing an objective lens, the method comprising forming a diffractive pattern on a portion of a surface of the objective lens without forming the diffractive pattern on another portion of the surface such that the another portion focuses a plurality of light beams, and the formed diffractive pattern has an optical property to selectively diffract one of the plurality of light beams, wherein the forming comprises etching a hologram having grooves on the surface as the diffractive surface.*

*62. A method of manufacturing an objective lens, the method comprising forming a diffractive pattern on a portion of a surface of the objective lens without forming the diffractive pattern on another portion of the surface such that the another portion focuses a plurality of light beams, and the formed diffractive pattern has an optical property to selectively diffract one of the plurality of light beams, wherein the forming comprises molding a hologram having grooves on the surface as the diffractive surface.*

* * * * *